UNITED STATES PATENT OFFICE.

CONRAD SCHRAUBE, OF LUDWIGSHAFEN-ON-THE-RHINE, ASSIGNOR TO THE BADISCHE ANILIN AND SODA FABRIK, OF MANNHEIM, GERMANY.

RED DYE.

SPECIFICATION forming part of Letters Patent No. 430,975, dated June 24, 1890.

Application filed March 3, 1890. Serial No. 342,445. (Specimens.) Patented in Germany May 6, 1888, No. 45,370, and in England October 23, 1888, No. 15,259.

*To all whom it may concern:*

Be it known that I, CONRAD SCHRAUBE, a subject of the King of Prussia, residing at Ludwigshafen-on-the-Rhine, in the Kingdom of Bavaria and Empire of Germany, have invented new and useful Improvements in the Manufacture of New Red Dye-Stuffs, (for which I have obtained Letters Patent in Great Britain, No. 15,259, bearing date October 23, 1888, and in Germany, No. 45,370, bearing date May 6, 1888,) of which the following is a specification.

My invention relates to the manufacture of new red dye-stuffs, which are chemically sulpho derivatives of a red basic naphthaline coloring-matter which has recently received the name of "rosinduline." (*Ber. Deutsch. Chem. Ges.*, 21, 2621. *Chem. Soc. Journ.*, No. 313, Dec., 1888, p. 1291.) This said rosinduline is formed when derivatives of alpha and beta naphthoquinone and nitroso and azo compounds of the naphthaline group are heated with aniline and aniline-hydrochloride. Although many compounds of these classes may be used for the production of the red basic naphthaline coloring-matter or rosinduline, still in point of economy very variable results are obtained, and I prefer, therefore, to prepare the said rosinduline by melting together benzene-alpha-naphthylamine with aniline-hydrochloride and aniline and to free the melt from unused aniline and aniline salt by boiling with dilute hydrochloric acid and filtering on cooling. This "crude product," or "melt freed from aniline," may be further purified by treatment with suitable solvents, or preferably may be at once treated with concentrated sulphuric acid and the crude monosulpho-acid thus obtained purified by conversion into its crystalline alkaline salts. The said monosulpho-acid is a crystalline body practically insoluble in water, and therefore not a dye-stuff, but owing to the crystalline properties of its alkaline salts it can readily be obtained in a state of practical purity, and is therefore a most suitable material from which to start in the preparation in accordance with this invention of the higher sulpho-acids, which are dye-stuffs.

Now, I have found that, whereas the action of concentrated sulphuric acid on rosinduline yields the monosulpho-acid practically alone, fuming sulphuric acid, monochlorhydrine sulphuric acid, ($SO_3ClH$,) or similar compounds whose action is due to their containing available sulphuric anhydride yield either with rosinduline or with its monosulpho-acid higher sulpho-acids, which dye animal fiber a brilliant red color from the acid bath. By carefully and suitably moderating the action of fuming sulphuric acid or similar body, as above mentioned, on rosinduline, or preferably upon its monosulpho-acid, a disulpho-acid is produced possessing the following characteristic properties: It is a red crystalline powder, slightly soluble in cold water, very much more readily in boiling water. A hot saturated solution on cooling deposits beautiful red crystals the of disulpho-acid, which are characterized by a brilliant bronze-like luster. It is slightly soluble in alcohol. It is soluble in concentrated sulphuric acid, producing a bright-green solution. Its reaction with caustic-soda solution differs essentially from that of the monosulpho-acid. If a little of the disulpho-acid be suspended in cold water and neutralized with caustic soda, a red solution is obtained, from which nothing separates out on boiling, but if too much caustic soda be added a red precipitate is obtained at once.

A further characteristic test consists in adding a little sodium-chloride solution to a solution of the sodium salt of the disulpho-acid. A precipitate is obtained which dissolves on boiling, (if necessary, a little water must be added,) and, on cooling, red crystals with a brilliant bronze-like luster separate out. The chemical composition of the free disulpho-acid is represented by the formula $C_{28}H_{17}N_3(SO_3H)_2$. This disulpho-acid dyes animal fiber in the acid bath a beautiful crimson tint and can be dyed in mixture with other acid dye-stuffs. It is further useful as a substitute for archil.

If the action of the fuming sulphuric acid (or similar body as aforesaid) upon the mono or di sulpho-acid or upon the red basic coloring-matter or rosinduline itself be increased, an acid is obtained which is probably more highly sulphonated and which is not claimed herein.

The following may serve as an example of the manner in which my invention is or may be best carried into practical effect:

The most convenient material for the production of the disulpho-acid is the monosulpho-acid, as hereinbefore explained. The red basic dye-stuff may, however, likewise be employed in its isolated or pure condition, preferably in the state of its sulphate or hydrochloride. In order to prepare the disulpho-acid from any of the aforesaid materials, about ten (10) parts, by weight, of the same are mixed with about thirty (30) parts, by weight, of fuming sulphuric acid containing about twenty-three (23) per cent. of free or available anhydride, the mixture being preferably well cooled by the external application of ice during the operation. The whole is then heated, while constantly agitating, to about 40° centigrade, until a sample diluted with ten times its quantity of water forms a precipitate which is completely soluble in boiling pure water. This sulphonating process usually requires from about two to three hours for its completion. The result of the operation is then gradually introduced into about two hundred (200) parts, by weight, of ice-water, whereby a precipitate is produced consisting of the disulpho-acid. This precipitate is filtered, pressed, and afterward mixed with or suspended in about four hundred (400) parts, by weight, of water. Caustic-ammonia liquor is then gradually added until a practically complete solution is effected. The solution is boiled and evaporated down until, on cooling, the ammonium salt of the disulpho-acid almost completely separates out in a crystallized condition, which point may be ascertained by taking samples of the solution from time to time and cooling the same. The separated dye-stuff is then filtered, pressed, and dried. In a similar manner the potassium and sodium salts of the disulpho-acid may be produced, being obtained in red bronze glittering crystals; but in order to obtain these crystals excess of alkali—that is, more than is necessary to neutralize—should be carefully avoided, as it interferes to a certain extent with their formation, and it is also advantageous to add the chlorides of potassium or sodium to the hot solution in order to render the crystallization of the respective saline compounds of the disulpho-acid on cooling more perfect and complete.

The free disulpho-acid is prepared from the above salts in the usual way by treatment with a mineral acid, and it may be crystallized from hot water. On account of the hereinbefore-described crystallizing properties of the ammonium, potassium, and sodium salts of the disulpho-acid this acid may also be obtained by sulphonating the red basic dye-stuff in its aforementioned semi-purified condition, or melt freed from aniline, with fuming sulphuric acid or similar body, as aforesaid, and then purifying the sulphonated product by recrystallizing an alkaline salt in the manner above described, but in practice such variation of the process has not been found to be advantageous.

What I claim as new, and desire to secure by Letters Patent, is—

As a new article of manufacture, the hereinbefore-described disulpho-acid of the red basic naphthaline coloring-matter, called "rosinduline," which disulpho-acid has the chemical composition represented by the formula $C_{25}H_{17}N_3(SO_3H)_2$, and which is characterized by the following properties: It is a red crystalline powder soluble in concentrated sulphuric acid, giving a bright-green solution; it is slightly soluble in cold water, more readily soluble in boiling water; its alkaline salts are crystalline and soluble in hot water, slightly soluble in cold water; the sodium and potassium salts crystallize from hot solutions on cooling after the addition of common salt; the free acid dyes animal fiber a bright-red color in the acid bath.

In testimony whereof I have hereunto set my hand in the presence of two subscribing witnesses.

CONRAD SCHRAUBE.

Witnesses:
GEORG KOERNER,
HERMANN HANTZ.